May 31, 1949. E. F. GIBIAN ET AL 2,471,948
METHOD OF MAKING POPPET VALVES
Filed Jan. 22, 1944
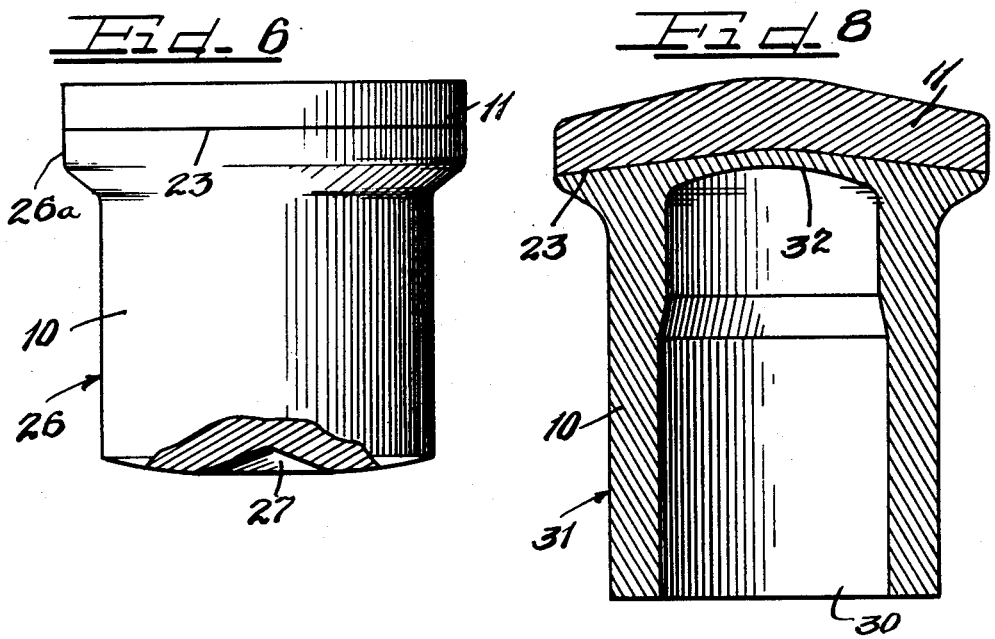
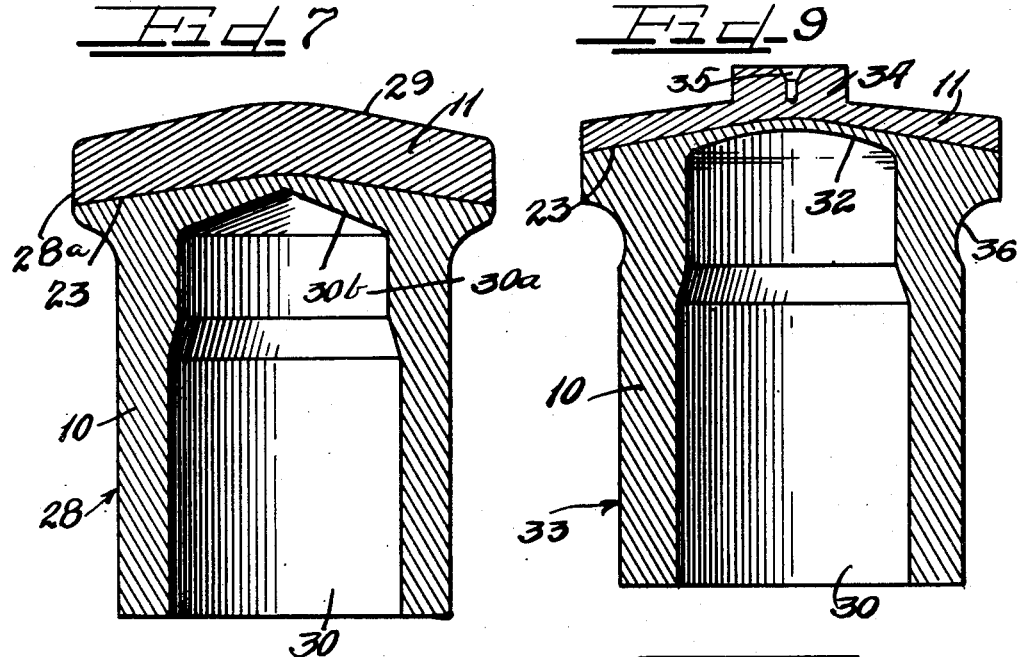

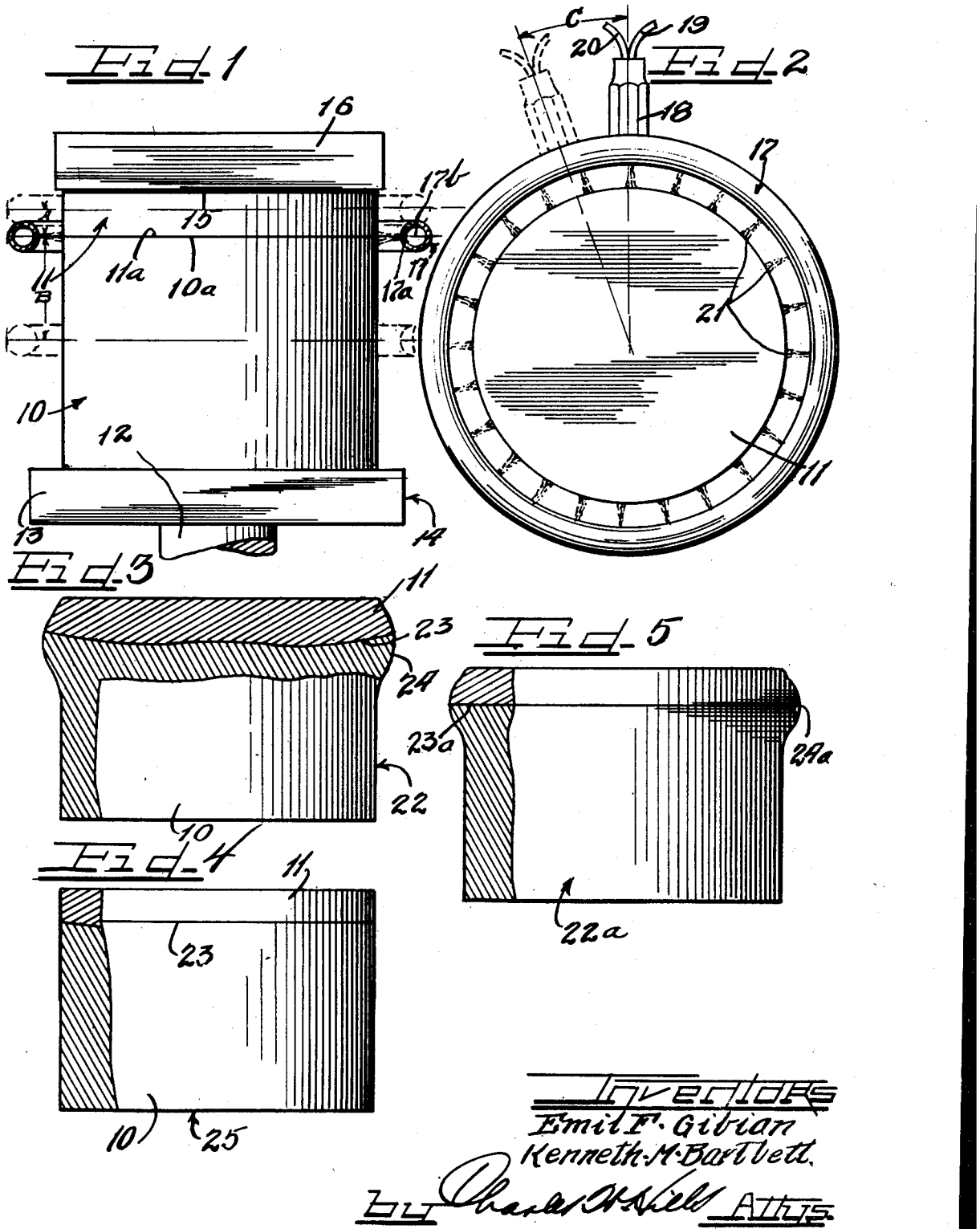

May 31, 1949.  E. F. GIBIAN ET AL  2,471,948
METHOD OF MAKING POPPET VALVES
Filed Jan. 22, 1944  4 Sheets-Sheet 3
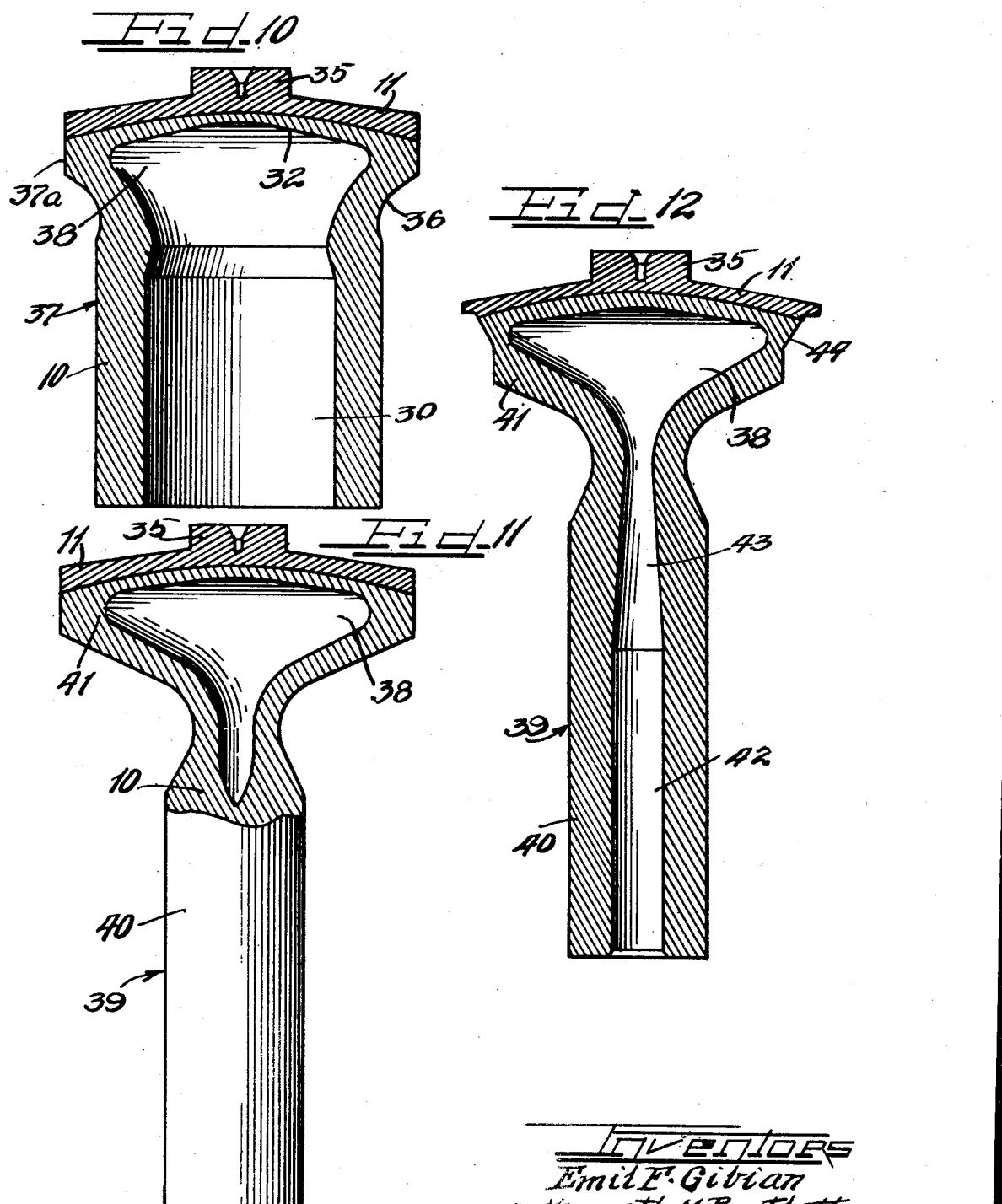

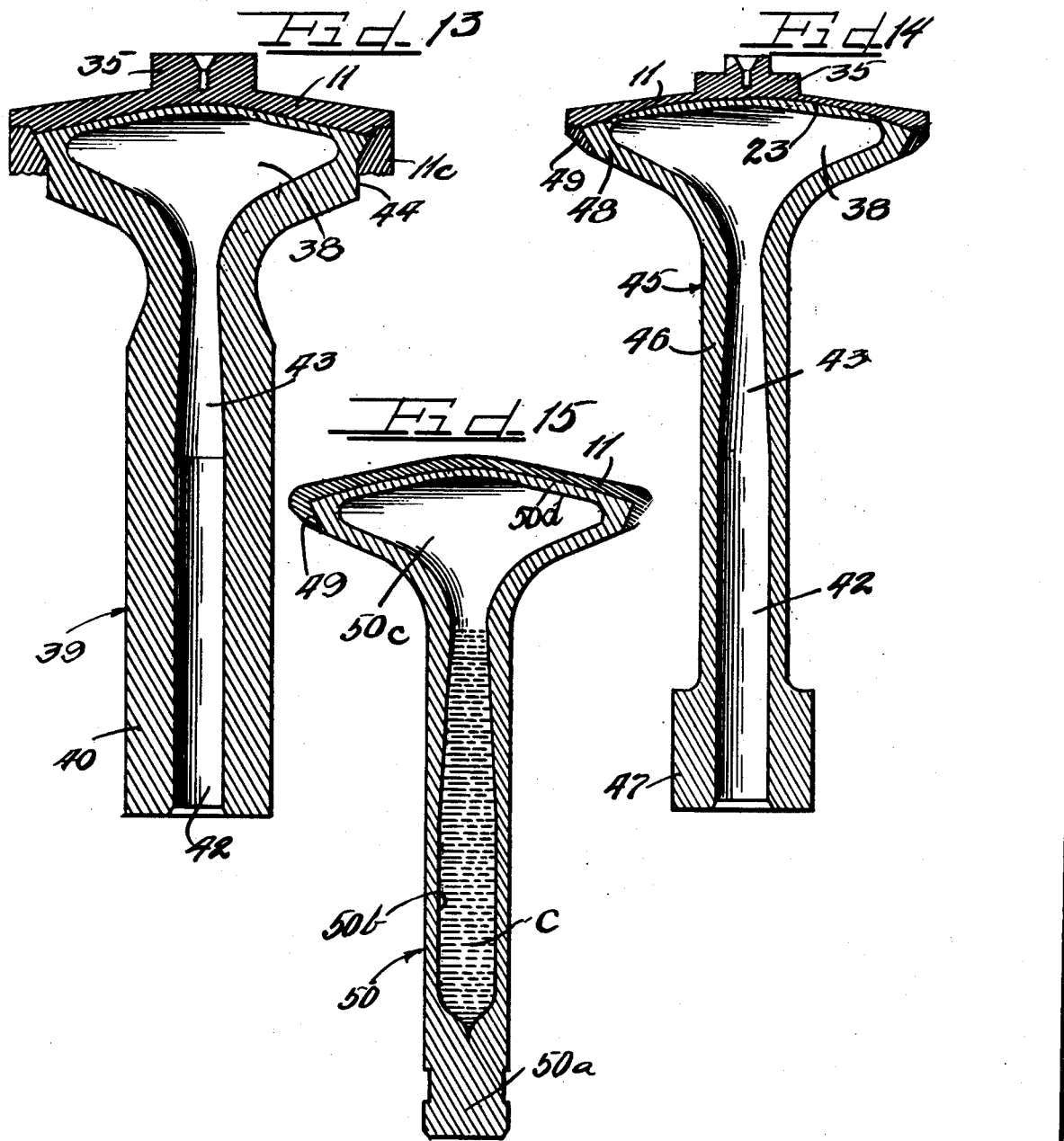

Patented May 31, 1949

2,471,948

UNITED STATES PATENT OFFICE 2,471,948

METHOD OF MAKING POPPET VALVES

Emil F. Gibian, East Cleveland, and Kenneth M. Bartlett, Cleveland, Ohio, assignors to Thompson Products, Inc., a corporation of Ohio Application January 22, 1944, Serial No. 519,280

2 Claims. (Cl. 29—156.7)

This invention relates to production of composite metal poppet valves which are especially suitable for use as exhaust valves in internal combustion engines such as aircraft engines.

More specifically the invention relates to poppet valves having corrosion-resistant metal clad head dome and seat portions for effectively resisting the corrosive atmospheres to which the heads of poppet valves are exposed in operation. The invention includes a method of making corrosion-resistant metal clad hollow poppet valves wherein the displacement of two different metals is controlled for producing uniformly the same position and contour of the weld line or bond area between the metals.

The heads and seat faces of metal poppet valves used in the exhaust ports of internal combustion engines, and especially aircraft engines, are subjected to high temperatures and corrosive atmospheres. Hollow poppet valves filled with coolants such as metallic sodium, for dissipating heat from the head of the valve, have been successfully used to withstand the tremendous heat to which they are subjected in operation as exhaust valves. However, higher engine speeds, increased engine compression ratios, higher engine temperatures, and more corrosive exhaust gases due to highly doped fuels, require the use of better exhaust valves in the modern aircraft engine than the heretofore highly successful one-piece sodium-cooled valves.

Such better valves are now produced by this invention. These valves are composite hollow poppet valves, composed of stress-resistant body metal, having the heads and seating faces thereof clad with a corrosion-resistant alloy. The body metal effectively resists the strains and stresses. The head and seating face metal effectively resists corrosion.

According to the present invention a bi-metallic blank is produced from a relatively thin billet of corrosion-resistant metal and a thicker billet of base metal. The billets are welded together under conditions which will produce a well-defined weld line, the position and contour of which is controlled. A highly successful welding process for producing the bimetal blanks includes the forming of clean mating end faces on the thin and thick billets and the pressing of these faces together at very high pressures while heating the faces to welding temperatures below the melting points of the billet metals. The pressed-together faces are sealed against ingress of gases and air so that no oxidation or scaling thereof occurs during the welding operation.

The pressure-welded bimetal blank has a bulged or upset bead portion adjacent the weld line which is removed to provide a straight cylindrical blank. This blank is heated and extruded to reduce the diameter of most of the base metal portion of the blank. The resulting extruded blank has a head somewhat larger in diameter than the diameter of the poppet valve to be made therefrom. Part of the head is composed of the corrosion-resistant metal from the thin billet, and the lower part of the head is composed of base metal from the thick billet which was not extruded through the extruding die. The extruding die preferably has a conical base portion at the axial center thereof to form a conical depression in the bottom of the blank.

By variation of the contour of an extruding punch for forcing the blank into the extruding die, the weld line of the blank can be controlled and slightly modified in size.

The extruded blank is next pierced to provide a hollow cup-shaped blank. The piercing punch and die are shaped to provide a desired profile for the welding line.

The bottom of the pierced blank is drilled to a desired depth for obtaining a desired thickness of base metal between the weld line and the bottom of the cavity. The thus-formed blank is then subjected to a series of extruding and forging operations for producing the finished valve. The partially formed valve preferably has a ring of corrosion-resistant alloy puddled around the head thereof to provide a seating face for the valve. This corrosion-resistant alloy merges with the corrosion-resistant metal from the thin billet, forming the head coating or cover for the valve head.

It is, then, an object of the invention to provide a manufacturing method for producing poppet valves having corrosion-resistant metal clad heads and seats together with tough, stress-resistant body portions.

A still further object of the invention is to provide corrosion-resistant metal clad poppet valves by a method involving a minimum of wastage of metal and providing a high degree of accuracy.

A still further object of the invention is to provide a method of making composite hollow poppet valves having a sharply defined line of demarcation between the metals thereof while at the same time having the metals completely bonded together.

A still further object of the invention is to provide a process of making hollow poppet valves wherein a composite metal blank composed of welded-together metals is treated so as to uniformly control the position and contour of the weld line joining the metals.

A still further object of the invention is to provide hollow poppet valves having corrosion-resistant metal clad heads and seating faces.

A still further object of the invention is to provide bi-metallic hollow poppet valves with head domes composed of welded-together metals of different characteristics.

A still further object of the invention is to provide a hollow poppet valve wherein the hollow head thereof is clad with a corrosion-resistant metal of dense structure, free from blow holes, and separated from the head cavity by a layer of base metal of controlled thickness.

Other and further objects of the invention will be apparent to those skilled in the art from the following detailed description of the annexed sheets of drawings which, by way of preferred example, illustrate preferred embodiments of the invention.

On the drawings:

Figure 1 is a side elevational view of a corrosion-resistant metal disk and a base metal cylindrical billet mounted in a press in end to end pressure relation and being heated adjacent the contacting surfaces thereof by a torch ring shown in vertical cross section.

Figure 2 is a plan view of the torch ring and billet assembly of Figure 1 illustrating the manner in which flame jets from the torch ring are impinged on the assembly.

Figure 3 is a side elevational view, with parts in vertical cross section, of a pressure-welded bi-metallic blank formed from the disk and cylindrical billet of Figure 1.

Figure 4 is a view similar to Figure 3, illustrating the bi-metallic blank of Figure 3 after removal of the upset or enlarged portion thereof formed during the pressure welding operation.

Figure 5 is a side elevational view, with a part in vertical cross section, of a bi-metallic blank formed by a pressure welding operation wherein different pressures are applied to the disk and cylindrical billet assembly as the heating of the assembly progresses.

Figure 6 is a side elevational view, with a part in vertical cross section, of a blank formed from the bi-metallic blank of Figure 4 by an extrusion operation.

Figure 7 is a vertical cross-sectional view of a pierced blank produced from the blank of Figure 6.

Figure 8 is a vertical cross-sectional view of the blank of Figure 7 after a bottom drilling operation.

Figure 9 is a vertical cross-sectional view of a blank produced from the blank of Figure 8 after machining operations have been performed thereon.

Figure 10 is a view of a blank produced from the blank of Figure 9 after a recess milling operation.

Figure 11 is a side elevational view, with a part in vertical cross section, of a valve blank produced from the blank of Figure 10 after hammering and extruding operations.

Figure 12 is a vertical cross-sectional view of a poppet valve blank produced from the blank of Figure 11 after additional machining and drilling operations.

Figure 13 is an axial cross-sectional view of a poppet valve blank produced from the blank of Figure 12 after a puddling operation thereon.

Figure 14 is an axial cross-sectional view of a blank produced from the blank of Figure 13 after additional machining operations.

Figure 15 is an axial cross-sectional view of the finished poppet valve according to this invention.

As shown on the drawings:

In Figure 1 the reference numeral 10 designates a cylindrical solid billet composed of forgeable stress-resistant metal such as an austenitic steel. If heat and corrosion-resistant properties are desired in the body portion of the valve to be produced according to this invention, the billet metal can be a nickel-chromium alloy austenitic steel such as a steel having the following formula:

| | Per cent |
| --- | --- |
| Nickel | 14 |
| Chromium | 14 |
| Tungsten | 2.40 |
| Carbon | 0.45 |
| Molybdenum | 0.35 |

Remainder substantially all iron.

The billet 10 is provided with a clean, smooth, flat end face 10a.

A solid cylindrical disk 11, which is much thinner than the billet 10 but which has about the same diameter as the billet 10, has a clean, flat, smooth end face 11a mounted on the end face 10a of the billet 10. The end faces 10a and 11a have complete contact with each other throughout their entire cross-sectional area.

The disk 11 is composed of corrosion-resistant metal examples of which are: nickel, chromium and iron alloys; nickel, molybdenum and iron alloys; non-ferrous nickel-chromium alloys; chromium-tungsten alloys, and the like.

The billet 10 with the disk 11 thereon is mounted on the press platen 13 of a movable ram 12 in a high pressure apparatus 14. The disk 11 is covered with a heat-resistant disk such as a mica disk 15, and a fixed top platen 16 of the press apparatus 14 covers the disk 15.

The ram 12 moves the platen 13 toward the fixed platen 16 of press 14 to exert pressures of from 4,000 to 6,000 pounds per square inch of contacting surfaces 10a and 11a. The optimum pressure will vary, depending upon the type of metal forming the billet 10 and disk 11.

A torch head 17, in the form of a ring, embraces the billet and disk assembly. This torch head 17 defines an annular passageway 17a completely enveloping the billet and disk. The head 17 has a plurality of jet holes 17b at spaced intervals around the inner periphery thereof joining the passageway 17a with the periphery of the billet and disk assembly.

As shown in Figure 2, a fitting 18 joins oxygen and acetylene conduits 19 and 20 respectively with the head 17 to supply welding flame-producing gases to the passageway 17a. These gases will bleed out through the holes 17b to form jets 21 which are ignited for impinging on the billet and disk assembly.

The torch head 17 and press 14, especially the top platen 16 thereof, can be cooled as by water jackets (not shown) for protection from the intense heat of the jets 21.

As indicated in dotted lines in Figure 1, the torch 17 is reciprocated axially of the billet and disk assembly to cover an area on both sides of the contacting surfaces 10a and 11a as designated by the arrows A and B.

Thus if the disk 11 is about one-half inch thick, the torch head 17 will be reciprocated to a height "A" above the end face 11a thereof. This height is about one-quarter inch.

If the billet 10 is about three inches in diameter and of a length sufficient to form a complete poppet valve body, the torch head 17 will be reciprocated along a length "B" of the billet, or about an inch and a quarter from the end face 10a thereof. Therefore the torch head 17 has an up-and-down reciprocal path of about an inch and one-half in length.

As indicated in Figure 2, the torch head 17 is also oscillated during the reciprocal movement thereof through an arc designated by the letter "C." This arc is usually about 15°. The oscillation of the ring 17 will move the jets 21 around the billet and slug assembly so that they will not continually impinge upon the same spot of the assembly. The oscillation is sufficient to swing the jets into overlapping area contact on the disk and billet assembly. The oscillation movement of the torch head 17 should be out of phase with the reciprocating movement of the torch head, so that the same spiral paths will not be traversed by the jets 21.

The jets 21 heat the billet and disk assembly inwardly from the outer peripheries thereof so that the contacting surfaces 10a and 11a are heated by conduction to welding temperatures. In about eleven minutes, three-inch diameter disks and billets are usually heated to welding temperatures below the melting points of the metals. The heating time and temperatures developed will depend upon the compositions of the metals used. For disks composed of non-ferrous nickel-chromium alloy and base metal billets composed of valve steels, welding temperatures of around 2300° F. are reached.

During the heating operation, the assembly is continually subjected to the selected pressure within the 4,000 to 6,000 pounds per square inch range by the press 14 and a blank 22 as shown in Figure 3 is produced. This blank is composed of the base metal billet 10 and the corrosion-resistant metal disk 11 integrally joined through a well-defined clean weld line 23 of uniform thickness and having a somewhat wavy contour. Thus, as shown in Figure 3, the weld line 23 has a somewhat convex central portion merging into concave outer peripheral portions. The weld line 23 may be described as having a dished shape with a somewhat raised central portion. Since the metal adjacent the contacting surfaces is softened by heat and is subjected to very high pressures, the soft metal will be upset to form an outwardly bowed bead 24. The resulting blank 22 is thus considerably shorter than the combined height of the billet 10 and disk 11, being in the nature of three-eighths of an inch to one-half inch shorter when three inch diameter billets are used.

During the pressure-welding operation, the mating faces 10a and 11a are actually sealed together so that no oxidation of the metals can occur and the molecules of the metal, in effect, are pressed together to fill in any voids which might exist if the contacting surfaces did not initially contact throughout their entire area. It is preferred, however, that the surfaces be initially given a high polish so that they will have full contact with each other.

If high pressure is continually applied on the assembly of Figure 1, the bead 24 of Figure 3 will extend well down into the base metal portion of the blank and may be split or cracked around the periphery thereof.

If, on the other hand, the assembly of Figure 1 is first subjected to low pressures of about 300 to 500 pounds per square inch of contacting surface for about eight minutes of the eleven-minute heating treatment and then, at the end of the eight minutes' time, when the contacting surfaces have been heated through to substantial welding temperature, the pressure is increased to about 4,000 to 6,000 pounds per square inch of contacting surface, a better bead formation is obtained, as shown in Figure 5. A blank 22a of Figure 5 has a bead 24a which is not cracked or split around its periphery and which does not extend down into the base metal as much as bead 24. Thus the bead 24a is confined over a narrower axial band area on the blank. In addition the weld line 23a of the blank 22a has a flatter contour.

A modified pressure welding technique according to this invention therefore involves application of low initial pressures during initial heating stages followed by high final pressures to obtain a better weld line contour and a narrower upset bead portion in the resulting bi-metal blank.

The blank 22 or the blank 22a of Figures 4 and 5 is lathe-turned or otherwise ground or machined to remove the bead 24 or 24a therefrom and produce the cylindrical bi-metal blank 25 of Figure 4 which is composed of base metal 10 clad with corrosion-resistant metal 11. The two metals are intimately and completely bonded along a sharply defined weld line 23.

The blank 25 is heated to forging temperatures of about 1950 to 2050° F., placed in an extruding die, and extruded to the shape of Figure 6 thereby producing a blank 26. The extruding die (not shown) has an extruding throat sloping at a predetermined angle to produce a predetermined amount of reduction. The blank 25 of Figure 4 is pushed into the extrusion die to produce the blank 26 by a punch (not shown) acting on the corrosion-resistant head end 11 of the blank and this punch has an end face of predetermined shape.

The angle of the extruding throat of the die, the amount of reduction effected by the die, and the shape of the end face of the punch, control the contour of the weld line 23 and alter its shape as desired.

The bottom of the extrusion die has a conical center point (not shown) for producing a depression 27 in the blank 26.

The blank 26 has the base metal 10 thereof reduced in diameter up to a point adjacent the weld line 23 but beyond this point the base metal has the same diameter as the diameter of the corrosion-resistant metal 11. The billet thus has a head portion 26a containing the weld line 23 and composed of both corrosion-resistant metal and base metal. The head 26a has a diameter greater than the desired diameter for the finished valve.

By variation of the contour of the extruding punch used to produce the blank 26, the contour of the weld line 23 can be varied. For example, if the extruding punch has a concave shape, a convex top for the head 26a is produced and the curvature of the weld line 23a is increased to increase the thickness of the corrosion-resistant metal around the circumference of the head 26a. Conversely, if the punch has a convex shape, a concave top is produced on the head 26a and the corrosion-resistant metal 11 will be thinned out around the circumference of the blank. This control makes possible the preparation of blanks for piercing operations where the desired contour of the weld line must be obtained. This contour is not to change during the manufacturing process after the piercing operation, and has to conform to the desired contour of the finished valve.

As shown in Figure 7, a pierced blank 28 is produced from the blank 26 of Figure 6 in a piercing die (not shown). The piercing die is a split female die receiving the blank 26 with the head 26a of the blank in the closed bottom end of the die. However, the closed bottom end of the die has an enlarged cavity with a concave bottom, accommodating displacement of metal from the head 26a of the blank 26. The piercing punch (not shown) enters the split die through the open top thereof to act on the depression 27 of the die 26 and pierce a hole into the base metal portion 10.

The piercing operation is carried out with the blank 26 being heated to forging temperatures such as 1950 to 2050° F., and the shape of the die, the shape of the punch, the depth of the pierce, and the amount of the displacement of the head metal will all contribute to control the contour of the weld line 23 between the base metal 10 and the corrosion-resistant metal 11. The blank 28 has a head portion 28a composed of both base metal and corrosion-resistant metal, and this head portion 28a has a convex top 29 following approximately the curved contour of the weld line 23.

The punch produces a cylindrical cavity 30 in the blank 28 extending substantially through the base metal portion 10 of the blank but having a reduced-diameter portion 30a adjacent the head 28a of the blank. The cavity 30 terminates in a conical bottom 30b spaced from the weld line 23.

The blank 28 of Figure 7 is next bottom-drilled to produce the blank 31 of Figure 8. Since the profile 32 in the bottom of the cavity 30 of the blank 31 must conform with the corresponding profile of the cavity in the finished valve to be formed from the blank, and since the thickness of the base metal 10 between the weld line 23 and the bottom 32 of the cavity must be held within the tolerances called for in the finished valve, it is preferable that the bottom-drilling operation be carried out in two steps. For example the blank 28 is first bottom-drilled to a lesser depth than desired. The thickness of the base metal 10 between the bottom of the cavity and the weld line 23 is then measured. A suitable measuring instrument is a high-frequency measuring machine described and claimed in the Rex De Ore McDill copending application Serial No. 491,664, filed June 21, 1943. The measuring operation determines how much deeper the bottom drilling should go to obtain the desired thickness of base metal between the welding line and bottom 32 of the cavity.

The blank 31 of Figure 8 is next subjected to machining operations to produce a blank 33 of Figure 9 wherein the corrosion-resistant metal 11 has been turned down to decrease the thickness thereof and leaves a lathe-centering lug 34 at the center of the head. This lug 34 has a lathe-pin receiving aperture 35 therein.

The blank 33 is also machined at the neck portion 36.

The blank 33 of Figure 9 is next recess-milled to produce a blank 37 of Figure 10 having an enlarged cavity 38 in the head 37a thereof adjacent the machined-in neck portion 36. In other words, the cavity 30 has an enlarged end portion 38 at the bottom 32 thereof.

Additional forging and extruding operations are carried out on the blank 37 of Figure 10 to produce the blank 39 of Figure 11. The blank 39 has a collapsed solid stem portion 40 composed of the base metal 10 from the initial billet and a head portion 41 with the enlarged head cavity 38 therein. The head portion 41 is composed of the base metal 10 having the top thereof clad with the corrosion-resistant metal 11.

The blank 39 of Figure 11 has the stem 40 thereof axially drilled to provide a cylindrical hole 42 extending inwardly from the free end thereof to a tapered hole 43 extending into the head cavity 38. The head portion 41 is machined around the periphery thereof to provide an annular recess 44. This recess 44 is defined by corrosion-resistant metal 11 around the upper end thereof and by base metal around the lower end thereof.

As shown in Figure 13, the groove 44 of the blank 39 has corrosion-resistant metal 11c puddled therein to become intimately welded with the head-covering metal 11 and the base metal forming the body portion of the valve. A ring of corrosion-resistant metal is thus formed around the periphery of the head of the blank.

The blank 39 of Figure 13 is next machined to produce the blank 45 of Figure 14. This blank 45 has a cylindrical stem portion 46 turned down to finished valve stem size but terminating in an enlarged nubbin end 47 of the same diameter as the stem portion 40 of the blank 39.

The blank 45 has the cylindrical hole 42 through the nubbin portion 47 and through a port of the valve stem portion 46 which merges into the tapered hole 43 and the tapered hole 43, in turn, merges into the head cavity 38.

The blank 45 has a valve head 48 composed of base metal clad with corrosion-resistant metal 11. The base metal has a controlled thickness between the weld line 23 and the cavity 38. The puddled-in metal 11c is machined down to form a valve seat 49 around the periphery of the valve head 48 composed of corrosion-resistant metal which may be the same as or different than the metal 11.

The blank 45 of Figure 14 has the cavity therein partially filled with sodium or other coolant C as shown in Figure 15 and the nubbin end 47 of the blank is collapsed to seal the coolant in the cavity. A finished valve 50 is thus produced with a solid stem end 50a, a stem cavity 50b containing the coolant C, a head cavity 50c of controlled contour, a head 50d clad with corrosion-resisting metal 11, and a corrosion-resistant valve seat 49.

The valve stem is composed entirely of the base metal from the original billet 10 and this base metal extends through the valve neck to the puddled-in seating face metal 49. The head is covered or clad with the metal 11 from the original disk 11.

The bi-metallic valve 50 of Figure 15 produced according to this invention thus has a body portion composed of stress-resistant metal with the head of this body portion covered by and integrally bonded to a corrosion-resistant metal. The valves of this invention thus have bi-metallic domes and seating faces. Tests have shown that the strength of the valves of this invention is equal to the strength of a valve composed entirely of the base metal. The thickness of the corrosion-resisting covering alloy for the valve head can vary throughout a wide range and, since the metal 11 covering the dome of the valve head is never brought to a molten stage during the valve-forming process, desired dense metallurgical properties can be maintained. The corrosion-resistant metal-clad poppet valves of this invention will withstand severe abuse in extremely bad corrosive atmospheres since the heads of the valves which are exposed to those atmospheres are protected, and the bodies of the valves which carry the stress loads are made from steels having the best stress-resisting properties.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of making hollow bi-metal poppet valves which comprises pressure-welding together a thick cylindrical billet of stress-resisting metal and a thin billet of corrosion-resisting metal, extruding and piercing the resulting bi-metal blank to form a headed blank having the head portion composed of stress-resisting metal covered with corrosion-resisting metal, controlling the contour of the weld line between the metals during the extruding and piercing operations for maintaining a uniform weld line contour, drilling the pierced portion of the resulting blank up to a level in advance of the weld line to control the thickness of stress-resisting metal in the head portion of the blank, extruding the drilled blank to form an enlongated stem from the stress-resisting metal portion thereof, forming a groove around the periphery of the head of the resulting extruded blank, welding a ring of stress-resistant metal in said groove in intimate bonded relation with both the stress-resisting metal and the corrosion-resisting metal of the valve head, and shaping the resulting blank into final poppet valve contour to provide a valve having a hollow stem and head with the head having a corrosion-resistant metal covering extending over the periphery thereof to provide a seating face.

2. The method of making hollow poppet valves having corrosion-resistant metal clad head domes which comprises pressure-welding together a stress-resistant metal piece and a corrosion-resistant metal piece, machining the resulting blank to form a cylindrical bi-metal blank having one end composed of corrosion-resistant metal, extruding the stress-resistant metal end of the cylindrical blank to reduce the diameter of said end and form a depression therein, piercing the reduced-diameter portion of the blank to a depth extending into the head portion thereof and controlling the distribution and thickness of the metals in said head portion during said piercing operation for regulating the profile of the weld line between the metals, bottom-drilling the pierced blank to a depth in advance of the corrosion-resistant metal piece to control the thickness of the stress-resistant metal between the weld line and the cavity in the blank, milling the pierced blank to enlarge the cavity in the head portion thereof, extruding the milled blank to reduce the stress-resistant metal portion thereof to elongated valve stem contour while collapsing the stem metal into solid form, drilling the collapsed stem to provide a hole therethrough communicating with the cavity in the head of the blank, forming a groove around the periphery of the head of the blank, puddling corrosion-resistant metal into said groove, and machining the resulting blank into finished valve contour to produce a hollow valve having a head and seating face clad with corrosion-resistant metal.

EMIL F. GIBIAN.
KENNETH M. BARTLETT.

REFERENCES CITED

The following references are of record in the file of this patent:

UNITED STATES PATENTS

| Number | Name | Date |
|---|---|---|
| 1,051,980 | Arkwright, Jr. | Feb. 4, 1913 |
| 1,984,751 | McBride | Dec. 18, 1934 |
| 2,002,641 | McBride | May 28, 1935 |
| 2,009,045 | Flinterman | July 23, 1935 |
| 2,030,500 | Colwell | Feb. 11, 1936 |
| 2,093,771 | Colwell | Sept. 21, 1937 |
| 2,183,254 | Charlton | Dec. 12, 1939 |
| 2,231,014 | Lytle et al. | Feb. 11, 1941 |
| 2,231,027 | Renner, Jr. | Feb. 11, 1941 |
| 2,316,488 | Rath | Apr. 13, 1943 |
| 2,354,947 | Colwell | Aug. 1, 1944 |
| 2,359,477 | Hoern | Oct. 3, 1944 |
| 2,392,152 | Johnson | Jan. 1, 1946 |
| 2,403,926 | Johnson | July 16, 1946 |
| 2,411,764 | Thoren | Nov. 26, 1946 |
| 2,415,606 | Novak | Feb. 11, 1947 |
| 2,415,912 | Scherl | Feb. 18, 1947 |